July 16, 1940.  W. J. BROZ  2,208,069
FISHHOOK
Filed May 14, 1938.
Fig.1
Fig.2
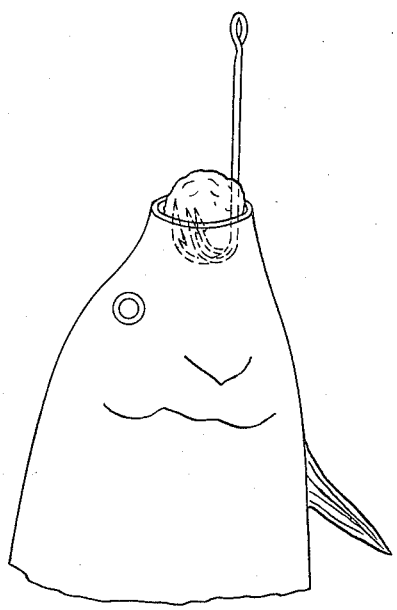
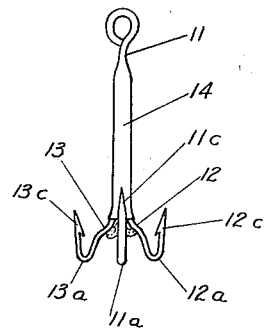
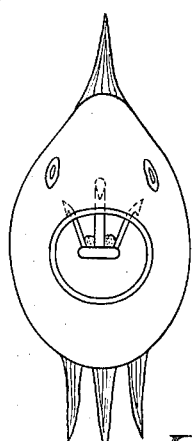
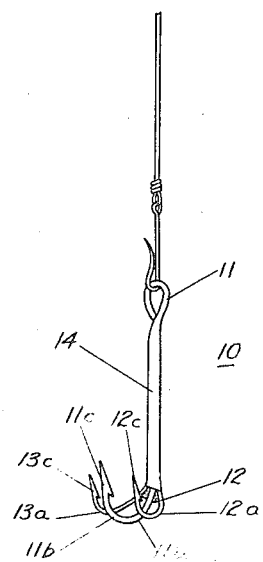
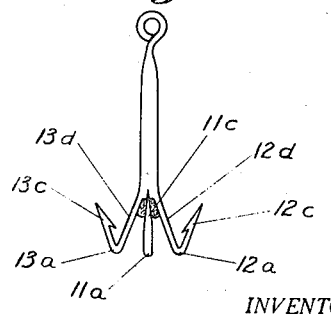
Fig.3
Fig.4
Fig.5
INVENTOR.
WILLIAM J. BROZ
BY Flournoy Corey
ATTORNEY.

Patented July 16, 1940

2,208,069

UNITED STATES PATENT OFFICE 2,208,069

FISHHOOK

William J. Broz, Prairieburg, Iowa

Application May 14, 1938, Serial No. 207,973

5 Claims. (Cl. 43—27)

My invention relates to fishhooks and has particular relation to fishhooks having a plurality of pointed barbs. Considerable attention has been paid to providing fishing tackle for catching game fish, but in many of our lakes and rivers the game fish are far outnumbered by the "soft" fish such as carp, buffalo, red horse, suckers and the like. It is quite possible to prepare these soft fish so that they make a tasty dish, and while such fish may not put up as much of a fight as the so-called game fish, this type of fishing provides recreation and amusement for thousands of people.

A difficulty in catching these so-called soft fish is that the single hook ordinarily used is likely to tear out of the fish's mouth by reason of the softer jaw structure. Three pronged fish hooks have been provided, but these hooks are disposed in planes approximately 120 degrees with respect to one another so that only one hook ordinarily comes into play at one time. Another disadvantage of the old treble hook is that, by reason of the 120 degree positioning of the hooks, all of the hooks cannot enter the mouth of a small mouthed fish.

It is an object of my invention, therefore, to provide a multi-pronged hook or a hook which will engage the fish's mouth at more than one point so that the load is distributed over the jaw and thus the hook will not tear out of the fish's mouth.

Another object of my invention is to provide a simple and reliable structure of the above character.

Another object of the invention is to provide means for better engaging the bait on a fishhook.

Other and further features and objects of the invention will be more apparent to those skilled in the art upon a consideration of the accompanying drawing and following specification, wherein are disclosed two exemplary embodiments of the invention, with the understanding, however, that such changes may be made therein as fall within the scope of the appended claims, without departing from the spirit of the invention.

In said drawing:

Figure 1 is a view in perspective taken from one side of the hook and showing how it is used in practice.

Figure 2 may be termed a front view of the hook shown in Figure 1.

Figure 3 is another side view in perspective showing a preferred form of hook structure.

Figure 4 is a top view of the hook shown in Figure 1 or a view as taken from the attachment end of the hook and illustrating same in use, and Figure 5 is a front view of a hook as in Figure 2 but illustrating a slight modification of the shape of the outer prongs.

Referring now to the drawing, and to Figures 1, 2 and 3 in particular, my invention consists primarily of a three barbed hook, the barbs of which are preferably placed at angles of approximately 30 degrees to each other. The hook may consist of a central or main hook at 11 and outer hooks 12 and 13, the barbs of which are angularly displaced from the barb of the central hook, the upper shanks of the two outer hooks being soldered, brazed, welded, or otherwise fastened to the shank of the central hook, as indicated at 14.

The bottoms 11a, 12a, and 13a of the hooks are preferably in the same horizontal plane. The central hook, however, is preferably heavier than the other two, and the barb should extend upwardly in the same plane as the shank but outwardly from the shank.

The barbs 12c and 13c of the smaller outer hooks are shaped so as to extend upwardly and outwardly from the shank, and at the same time outwardly from the center barb. In other words, the barb of each outer hook forms a slight angle with the shank and at the same time forms a slight angle with a plane drawn through the barb and the shank.

All the barbs are preferably kept within a circle determined by the common shank and the central barb of the hook. Therefore it can readily be seen from Figure 1 that this type of hook can enter the mouth of a fish almost as easily as the ordinary single barbed hook.

The barb of the central hook which should be slightly longer than the other barbs naturally imbeds itself in the fish's mouth first, and it can readily be seen that one of the other two barbs is almost sure to take hold also, and it is more than likely that all three hooks or barbs will take effect. The barbs are placed widely enough apart so that even in the soft mouthed fish, the strain is spread over a wide enough area within the fish's mouth to make it very difficult for the fish to tear loose from the hook.

Figure 4 representing what may be termed an end view of the hook as seen in the mouth of a fish, illustrates the relatively small amount of space taken up by the hook, and illustrates the relative angular placement of the barbs.

Figure 5 illustrates a modification of the hook illustrated in previous figures. The outer barbs are shown as inclined at a slightly greater angle to the vertical. Furthermore, the rear bent portion of each of the outer hooks next adjoining the common shank is bent outwardly at an angle to the back portion of the central hook so as to space the bottom portions 12a and 13a farther away from the bottom portion 11a of the central hook without changing the placement of the barbs. This also helps to distribute the strain more widely over the mouth of the fish.

It is apparent that bait may be more securely fastened to a hook having three barbs and be less likely to be lost than when placed upon a single barbed hook. A small fish used as bait may be placed upon the central barb and its tail and head impaled upon the outer smaller barbs. Bait such as worms may be placed upon the central barb and the loose ends held by the outer barbs. Other bait such as dough bait may be placed in the cradle shaped space formed by the bottom of the hook as shown in Figure 1. The three separated supporting points help to prevent the washing away of the bait due to the current of the water. Furthermore the bait may be so placed as to make it very difficult for a fish to take the bait without coming into contact with at least one of the hooks.

Although I have described a specific embodiment of my invention, it is apparent that modifications thereof may be made by those skilled in the art. Such modifications may be made without departing from the spirit and scope of the invention as set forth in the appended claims.

I claim as my invention:

1. In a fishhook, a shank, a large central hook, a plurality of smaller pointed barbs upwardly and outwardly directed and fixedly attached at their inner ends to the said shank and arranged about the shank and made of such sizes of hooks that all the hooks will be included in a circle the diameter of which is determined by the barb of the central larger hook and the shank.

2. In a fishhook, a main central hook comprising a shank with an attachment opening at its upper end, a curved and barbed portion at its lower end and extending outwardly and upwardly from the lower end, and auxiliary barbs fastened to and extending upwardly and outwardly from the lower end of the shank but angularly displaced approximately 30 degrees in either direction from the central barb.

3. In a fishhook, a common shank with attachment means, a plurality of pointed barbs extending upwardly and outwardly from the lower end of the shank and having a total included angle of approximately 60 degrees between the outermost barbs.

4. In a fishhook, a shank, a main barb extending upwardly and outwardly from the bottom of the shank, and two additional barbs, one on either side of the main central barb and displaced therefrom approximately 30 degrees the bottom portions of all barbs being in approximately the same horizontal plane and the barbs of the outer hooks extending upwardly and outwardly from the central shank and, at the same time, extending outwardly from the central barb.

5. A fishhook comprised of three hooks joined on a common shank, with the center hook formed and arranged so that the barb projects in substantial parallel alignment with the center line of the shank, and with the two outer barbs disposed at slight outwardly inclined angles with reference to the center line of the shank, whereby the points of the hooks are substantially in a plane parallel to the center line of the shank.

WILLIAM J. BROZ.